United States Patent
Kuo et al.

(10) Patent No.: US 10,841,119 B1
(45) Date of Patent: Nov. 17, 2020

(54) DEVICE REPRESENTATION MANAGEMENT USING REPRESENTATION TYPES

(71) Applicant: Amazon Technologies, Inc., Seattle, WA (US)

(72) Inventors: Calvin Yue-Ren Kuo, Irvine, CA (US); Shyam Krishnamoorthy, Redmond, WA (US); Mark Edward Rafn, Cambridge (GB); William Alexander Stevenson, Seattle, WA (US); Alan Conrad Rawcliffe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 16/410,902

(22) Filed: May 13, 2019

Related U.S. Application Data

(62) Division of application No. 15/196,700, filed on Jun. 29, 2016, now Pat. No. 10,291,424.

(51) Int. Cl.
*H04L 12/28* (2006.01)

(52) U.S. Cl.
CPC ........ *H04L 12/281* (2013.01); *H04L 12/2816* (2013.01)

(58) Field of Classification Search
CPC ..... H04L 63/101; H04L 63/10; H04L 9/3234; H04L 12/2803; G06F 2211/009
See application file for complete search history.

(56) References Cited

U.S. PATENT DOCUMENTS

| | | | | |
|---|---|---|---|---|
| 7,565,433 B1 * | 7/2009 | Lamport | .............. | G06Q 10/107 700/2 |
| 7,620,680 B1 * | 11/2009 | Lamport | ............. | H04L 63/1441 709/201 |
| 7,680,836 B2 * | 3/2010 | Anderson | ......... | G06F 17/30088 707/999.202 |
| 7,720,509 B2 * | 5/2010 | Famolari | ............... | H04W 16/28 343/893 |
| 7,797,324 B2 * | 9/2010 | Miyoshi | ............ | G06F 17/30011 707/741 |
| 8,107,397 B1 * | 1/2012 | Bagchi | .................. | H04L 9/0822 370/254 |

(Continued)

*Primary Examiner* — Arvin Eskandarnia
(74) *Attorney, Agent, or Firm* — Thorpe North & Western, LLP.

(57) ABSTRACT

A technology is described for operating a device shadowing service that manages device representations for physical devices that are network addressable. An example method may include associating a device representation with a representation type, where the device representation represents a copy of a state of a physical device in network communication with a device shadowing service that maintains the device representation, and the representation type may define a command that can be invoked through the device representation. After the device representation has been associated with the representation type, the command may be invoked through the device representation. Invoking the command may involve identifying the representation type associated with the device representation and determining that the command is supported by the representation type. Thereafter, the command may be executed.

20 Claims, 8 Drawing Sheets

(56) References Cited

U.S. PATENT DOCUMENTS

| | | | |
|---|---|---|---|
| 2004/0025018 A1* | 2/2004 | Haas | H04L 45/26 |
| | | | 713/168 |
| 2004/0158723 A1* | 8/2004 | Root | G06F 21/32 |
| | | | 713/186 |
| 2007/0203997 A1* | 8/2007 | Ingerman | G06Q 10/107 |
| | | | 709/206 |
| 2008/0084294 A1* | 4/2008 | Zhiying | G08B 21/12 |
| | | | 340/539.22 |
| 2009/0006597 A1* | 1/2009 | Bade | G06F 21/577 |
| | | | 709/223 |
| 2009/0216910 A1* | 8/2009 | Duchesneau | G06F 9/5072 |
| | | | 709/250 |
| 2017/0070361 A1 | 3/2017 | Sundermeyer et al. | |
| 2018/0278607 A1* | 9/2018 | Loladia | H04L 41/0893 |

* cited by examiner

DEVICE REPRESENTATION MANAGEMENT USING REPRESENTATION TYPES

PRIORITY DATA

This application is a divisional of U.S. patent application Ser. No. 15/196,700 filed on Jun. 29, 2016, which is incorporated by reference herein.

RELATED APPLICATIONS

This application is related to U.S. patent application Ser. No. 15/196,792, filed on Jun. 29, 2016, and is incorporated by reference herein.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for the purpose of transmitting status and receiving external control communications.

DETAILED DESCRIPTION

Figure 1:
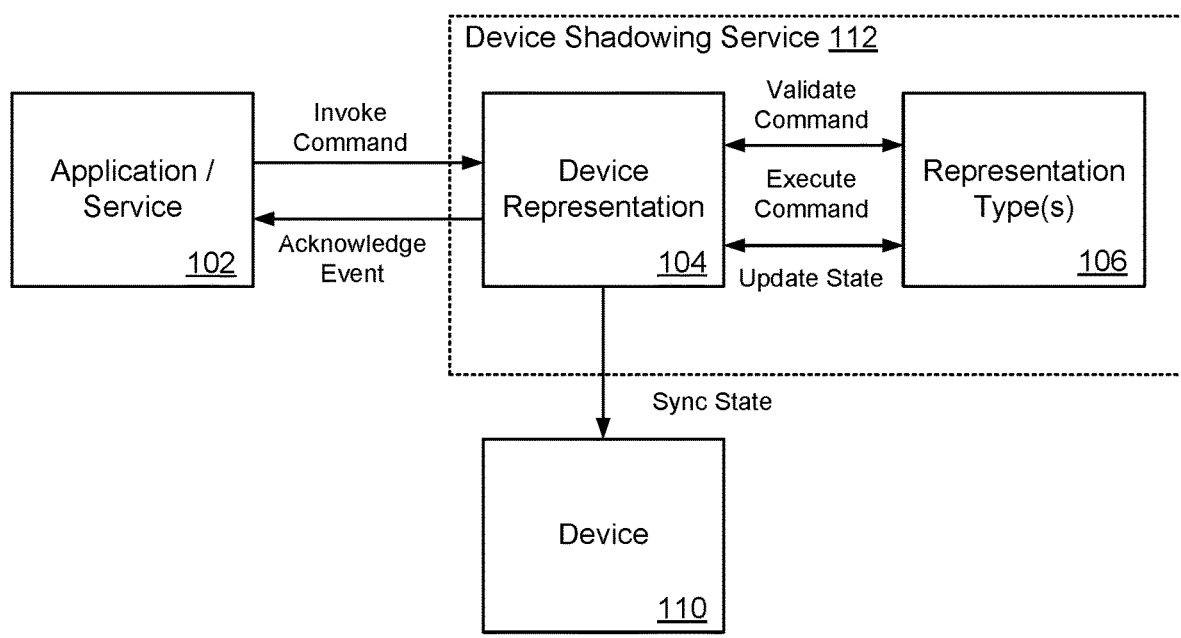
FIG. 1 is a block diagram illustrating an example flow for invoking a command that updates a state of a device representation associated with a device.

A technology is described for a device shadowing service configured to manage device representations associated with devices that may be network addressable and/or ultimately addressable via intermediary addressable devices and manage commands and events used to interact with the device representations. A device representation may be associated with a representation type that defines states, commands, and events supported by the device representation. A device representation may be an electronic representation of a device (e.g., a physical device with a sensor that is connected to a network or receives relayed messages). A device may report state changes and other information to the device shadowing service, and the reported information may be stored within a device representation associated with the device. A device may be one of many devices that create a large network of addressable devices. This "network" is commonly referred to as the Internet of Things (IOT).

In one example of the technology, the device shadowing service may be configured to receive messages invoking commands associated with devices. For example, the service may be subscribed to a named publication/subscription channel and applications configured to interact with the devices may publish commands to the named publication/ subscription channel. A command may be used to retrieve state information for a device, instruct a device to assume a specified state, or cause the service to execute a function (e.g., extended virtualized commands) that expands the functionality of a device beyond a physical capability or configuration of the device.

A device representation may be assigned a representation type that defines possible states of a device associated with the device representation, as well as commands (e.g., inputs) and events (e.g., outputs) supported by the device. The representation type may be stored in a device shadowing service in a computing service (e.g., a "cloud" environment). In receiving a message invoking a command, the device shadowing service may be configured to identify a representation type and determine whether the representation type supports the command. As an illustration, a device representation for a network addressable light may be assigned a representation type that supports a "LightOff" command and a "LightOn" command. In the example where the command "LightOff" is invoked against the representation type, the command may be validated against the representation type and a determination may be made that the device representation supports the command, because the command "LightOff" is defined by the representation type. In the example where the command "ChangeLightColor" is invoked, validating the command against the representation type may result in the determination that the command is not supported by the device representation because the representation type does include a definition for a "ChangeLightColor" command.

In executing a command supported by a device representation, the state of the device representation may be referenced and/or updated as part of executing the command. As an example, in executing the command "GetLightStatus" through a device representation associated with a network addressable light, the current state of the device representation may be referenced to determine the current state of the network addressable light. After executing a command that modifies the state of a device representation, a device associated with the device representation may be instructed to assume the state of the device representation. As an example, after updating the state of a device representation for a network addressable light to "on", the network addressable light may be instructed to power on.

FIG. 1 is a diagram illustrating an example flow for invoking a command that updates a state of a device representation 104 associated with a device 110. The device 110 may be registered with a device shadowing service 112 which is configured to create and manage a device representation 104 for the device 110. The device representation 104 may be an electronic representation (e.g., a data object) of the device 110 that can be referenced and updated, even at times that the device 110 itself may be unreachable. For example, to conserve power, some battery-powered and other devices may disable wireless radios when not actively transmitting data to the device shadowing service 112 or polling the device shadowing service 112 for updates. For these and other reasons, a device 110 may connect to a network only intermittently, while an application or service 102 may attempt to interact with the device 110 at times that the device 110 may not be connected to the network or may not otherwise be available.

In order to overcome limitations associated with intermittent connectivity, the device shadowing service 112 may maintain a cached device representation 104 of a device 110 that allows an application or service 102 to access information, such as state information, for the device 110 at any time. A device 110 may report state changes and other information to the device shadowing service 112, and the reported information may be stored within the device representation 104. For example, the device representation 104 may be stored as a data store object using a data-interchange format like JavaScript Object Notation (JSON). The cached information may then be made available to applications and services 102 at any time by the device shadowing service 112 without the need to wake up or otherwise contact the device 110.

The device representation 104 may be assigned one or more representation types 106 that define the states, commands, and events accessible through the device representation 104. As an example, a state representation type for a device representation 104 associated with a network addressable light may define the device states "on" and "off". A command representation type may define the commands "OnCommand" and "OffCommand". And an event representation type may define the events "OnEvent" and "OffEvent".

A representation type 106 may have a schema that defines a structure of the device representation 104. For example, a schema may define attributes of a representation type 106. As an illustration, a network addressable light assigned a state representation type having a schema may include a state attribute "color" that contains red, green, and blue integer values. An example declaration may look like:

{"state":{
"color":{
"red": "int(0,255)",
"green": "int(0,255)",
"blue": "int(0,255)"}
}}

As such, the possible color states associated with the network addressable light in the example above are defined by the example declaration and the state representation type can be advertised to applications, services, and other devices to facilitate interaction with the network addressable light via the device representation 104. For instance, applications and services 102 may query the device shadowing service 112 for a device representation 104 to determine how to interact with an associated device 110. As an example use case, an application on a mobile device may be used to obtain or request a command representation type for network addressable lights (e.g., a template listing the possible commands for lights) located in a room to determine whether the lights support a power on command, a light dimming command, or a change color command. In the case that the command representation type for the network addressable lights supports a command, a user of the mobile device may control the lights in the room via the application on the mobile device.

In addition to defining commands that are supported by a device 110, a representation type 106 may be used to define extended virtualized commands that expand the functionality of the device 110 beyond a current configuration of the device 110. As one example, a simple network addressable temperature sensor may be configured to send temperature data over a network, but otherwise may not have the ability to process the temperature data itself. In order to provide additional functionality associated with the temperature sensor, temperature data may be accumulated in a data store that is external to the device and an extended virtualized command "AverageTemp" that calculates an average temperature may be defined in a representation type 106 assigned to a device representation 104 for the temperature sensor. Applications and services 102 may invoke the "AverageTemp" command through the device representation 104 and obtain an average temperature generated by the temperature sensor. As another example, executing a command against a first device representation may result in modifying a state of a second device representation. For example, executing a command that updates the state of a device representation for a network addressable light to "On" may result in updating a state of a device representation for a network addressable thermostat to "Room Occupied".

In one example, an application or service 102 may invoke a command against a device representation 104 by publishing a message to a named command channel (e.g., a topic in a publication/subscription system) to which the device shadowing service 112 subscribes. As an illustration, a command topic publication may look like: "$shadowservice/things/tempsensor123/command/GetTemp/invoke". In another example, a Representational State Transfer based (RESTful) API configured to communicate with the device shadowing service 112 may be used to invoke a command against a device representation 104. As an illustration, an API request may look like: "https://device shadowingservice.com/endpoint/things/tempsensor123/command/GetTemp/invoke".

A command received at the device shadowing service 112 may be validated against a representation type 106 assigned to a device representation 104 to determine whether the command is supported by the representation type 106. In the case that a command is defined by a representation type 106 and the command format complies with a command schema, the command may be executed. In the case that a command may not be defined in the representation type 106, or the command may not comply with a command schema, the command may not be executed. As an illustration, the commands "PowerOn" and "PowerOff" may be defined by a representation type 106 assigned to a device representation 104. A request to invoke the "PowerOn" command against the device representation 104 may be successful when validated against the representation type 106 and the "PowerOn" command is defined by the representation type 106 and the command complies with the schema of the "PowerOn" command defined in the representation type 106. However, a request to invoke a "Sleep" command will not be successful because the "Sleep" command is not defined by the representation type 106. Thus, the "Sleep" command may be failed before any attempt is undertaken to send the command to the device 110.

After a command has been validated, the command may be executed, which may result in updating a state of a device representation 104. As an illustration, executing a "PowerOn" command results in changing the state of a device representation 104 from an off state to an on state, thus the state represented by the device representation 104 may be updated to "on". After updating a state of a device representation 104, a device 110 associated with the device representation 104 may be instructed to assume the state of the device representation 104. As an illustration, a device 110 may be instructed to assume the state of a device representation 104 having the state "on", whereupon the device 110 may power on.

An acknowledge event may be generated in association with executing a command and the acknowledge event may be provided to the application or service 102 that invoked the command. Events may be output by a device representation 104 and/or by a device 110. Like commands, an event may have a representation type 106 that defines the structure of an event using a schema. As an example, a representation type 106 for a device representation 104 associated with a network addressable light may define a "ColorChanged" event and/or event format that may be emitted when the color of the light is changed. As another example, a representation type 106 for a device representation 104 associated with a network addressable motion sensor may define a "MotionDetected" event and/or format that may be emitted when motion is detected. Events may be published to a named event channel (e.g., event topic) in order to notify applications and/or services 102 subscribed to the event channel that the event occurred, or events may be distributed to applications and/or services 102 using a RESTful API.

In some examples, the device shadowing service 112 may be configured to validate that a payload structure of an event conforms to an event schema. For example, in the case that an event schema specifies a JSON format for event payloads, a payload structure of an event may be analyzed to ensure that the payload structure conforms to a JSON format.

Figure 2:
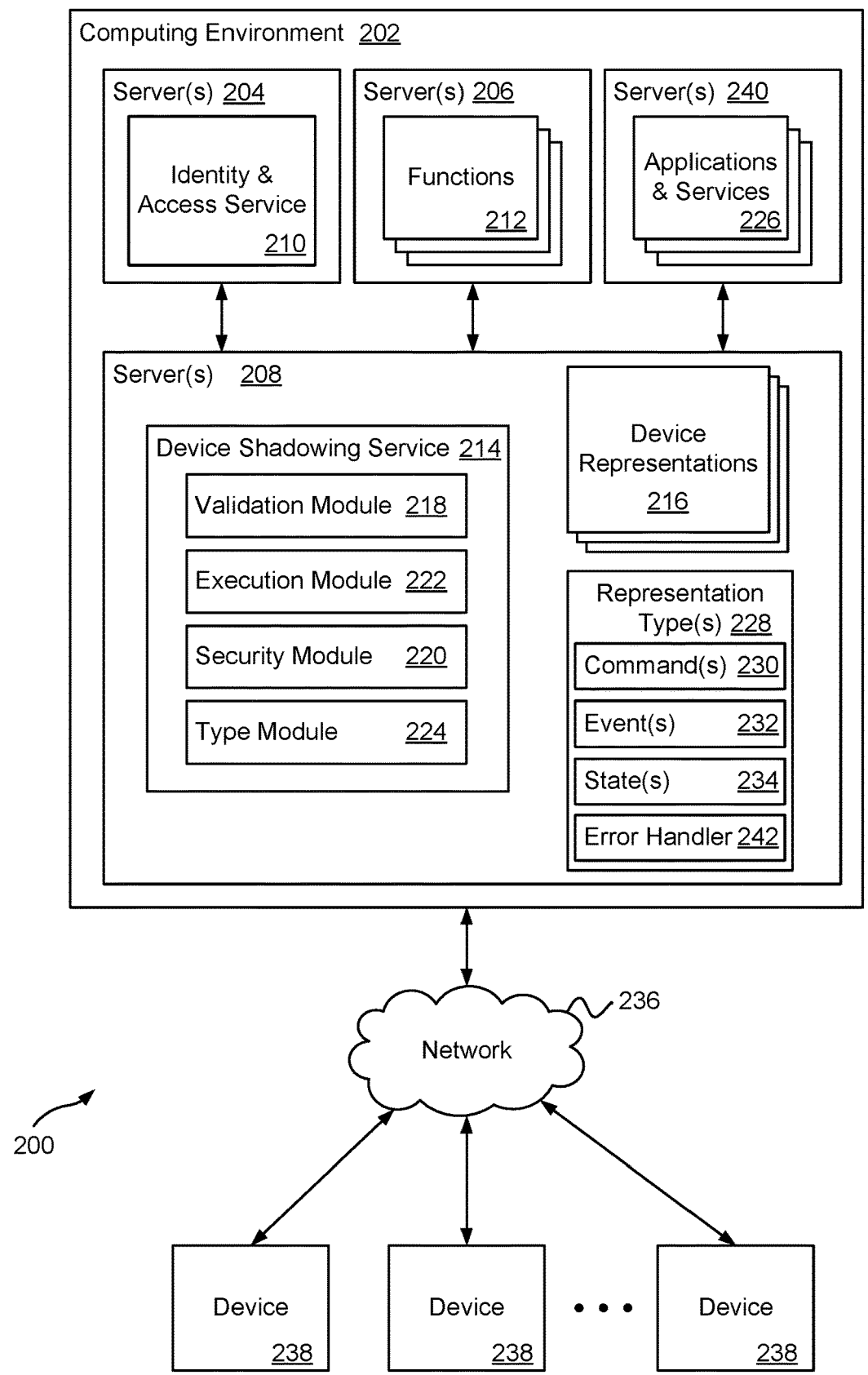
FIG. 2 is a block diagram that illustrates various example components included in a system for a device shadowing service configured to manage device representations associated with devices.

FIG. 2 illustrates components of an example system environment 200 on which the present technology may be executed. The system environment 200 may include a plurality of device 238 in communication with a computing environment 202 via one or more networks 236. Illustratively, devices 238 can include network addressable: global positioning devices, temperature sensors, water sensors, light switches, lightbulbs, power outlets, watches, media players, voice command devices, video cameras, doorbell systems, door locks, smoke alarms, thermostats, weather sensors, security systems, automobiles, electronic readers, printers, handheld devices, as well as any other device that may be configured to communicate over a network 236.

The computing environment 202 may include servers 204/206/208/240 for executing computing instances (e.g., virtual machines), which may be an instance of a software implementation of a machine (i.e. a computer) that executes applications like a physical machine. The computing instances may host various services associated with the devices 238. The server 208 may include a computing instance that hosts a device shadowing service 214 configured to manage device representations 216 associated with the devices 238 and handle commands and events executed against the device representations 216. In one example, the device shadowing service 214 may include a validation module 218, an execution module 222, a security module 220, and a type module 224.

A device representation 216 may represent a state of a particular device 238 and the device shadowing service 214 may be configured to perform one or more operations based in part on a state represented by the device representation 216. For example, a device representation 216 may represent a network addressable weather station and may perform an operation (e.g., set a fire danger reading, like "Low", "Moderate", and "High") based in part on the aggregate state of the weather station.

A device representation 216 may be associated with a representation type 228. A representation type 228 may be declared for a device representation 216 or an existing representation type 228 may be assigned to a device representation 216. A representation type 228 may be associated with a type schema and a representation type 228 may be assigned a version (allowing for updates to the representation type 228). In one example, a representation type 228 may define possible states 234 that a device representation 216 and an associated device 238 may assume, one or more input commands 230 that may be invoked through the device representation 216, and one or more output events 232 that may be invoked through the device representation 216. A command 230 may be an instruction that a device representation 216 assume a specified state (wherein an associated device 238 assumes the state of the device representation 216), or a command may cause the execution of a function 212 that extends the functionality of an associated device 238. An event 232 may be an output from a device representation 216 or an associated device 238. For example, an event 232 may be a notification that a device representation 216 and/or an associated device 238 has assumed a state or that a command 230 has been executed.

In one example, canonical models of representation types 228 and canonical models of commands 230 may be declared. Canonicalization of types 228 and commands 230 may allow device representations 216 for heterogeneous devices 238 to utilize the same representation type 228, and allow applications and services 226 to address (e.g., call) devices 238 (via device representations 216) using a command without having to first determine a command structure for each specific device 238.

Commands 230 and events 232 may be invoked by sending a message or request to the device shadowing service 214 that references the device representation 216 and a command 230 or event 232. As an illustration, a command may be invoked using the example format "$shadow_service/things/device_representation/command/invoke". The validation module 218 may be configured to validate a command 230 or event 232 against a representation type 228 associated with a device representation 216.

In one example, a representation type 228 may define commands 230 and events 232 that are supported by a device representation 216. A command 230 or event 232 may be validated against a representation type 228 via an operation that verifies that the representation type 228 includes a definition for the command 230 or event 232. In addition, a representation type 228 may define error handlers 242 for commands 230, events 232, and states 234 defined by the representation type. Error handling may be utilized in cases that the representation type 228 does not support a command, event, or state. For example, the representation type 228 may define an error handler 242 that generates an error message and publishes the error message to a topic, resulting in notifying an application, service, or other device subscribed to the topic that a command, event, or state change failed to execute due to not being supported by the representation type 228.

In some examples, a command 230 may have a command type associated with a command schema that defines a structure of the command 230. For example, a command type may define a format of a command 230 using a schema and may define parameters that may be included when invoking the command 230. Also, as indicated above, commands 230 may comply with a canonical model defining uniform standards for a command structure and command content (e.g., parameters) provided to the device shadowing service 214. Like commands 230, events 232 may also have an event type associated with an event schema that defines a structure of the event 232, and events 232 may comply with a canonical model that defines uniform standards for an event structure and event content.

The type module 224 may be configured to provide customers with an interface used to upload, create, modify and/or assign types 228 (including command types, event types, and state types) to a device representation 216. The types 228 may be assigned a version and a reference to a representation type 228 made by an application and/or service 226 may include a version used to identify the representation type 228.

The security module 220 may be configured to control access to a device representation 216 according to a type 228 associated with the device representation 216 and/or a command 230 included in the representation type 228, thereby controlling access to a device 238 associated with the device representation 216. More specifically, a device representation 216, or certain features of a device representation 216 may be made private by making a representation type 228 private. Public representation types may be accessible to any applications and services 226, whereas private representation type access may be limited to authorized applications and services 226. For example, a customer may use security policies to control who has access to a representation type 228 or to individual commands 230, events 232, and/or states 234 included in a representation type 228. For instance, a customer may control access to the customer's device 238 by making a representation type 228 assigned to a device representation 216 private and create a security policy that grants certain users (e.g., applications, services, and other devices 238) access to the representation type 228. The security module 220 may validate a request to interact with a device representation 216 by querying an identity and access service 210 to validate the identity of a requester and determine whether the requester has been granted rights to a representation type 228, command 230, and/or event that results in giving the requester access to the device representation 216.

The execution module 222 may be configured to execute commands 230 and events 232 in response to requests received at the device shadowing service 214. For example, after a request to execute a command 230 or event 232 has been validated against a representation type 228, the execution module 222 may execute the command 230 or event 232. In one example, executing a command 230 may comprise calling a function 212 configured to execute the command 230. Functions 212 may, in one example, be executed on a server 206 that hosts the functions 212. For example, a function 212 and function dependencies may be packaged in a software container and the software container may be placed on the server 206. The execution module 222 may be configured to call the function 212 hosted on the server 206 and function results may be returned to the execution module 222.

In some examples, as part of executing an event 232, the execution module 222 may be configured to call a function that evaluates the event 232 prior to the execution module 222 publishing a message generated as part of the event 232. For example, a device 238 or a device representation 216 may request the execution of an event 232 associated with a function 212. The function 212 may execute logic (e.g., a business rule) that may be performed prior to emitting the event (e.g., add information to the event, cancel the event, etc.) The execution module 222 may call the function 212 and then based in part on the results of executing the function 212, the event may be emitted (e.g., published).

In one example, communications associated with commands 230 and events 232 may be sent and received using a publication/subscription service. In such a service, messages may be published to named logical channels, also referred to as topics, and the messages published to the topics may be received by subscribers to the topics. In another example, communications associated with commands 230 and events 232 may be implemented using a RESTful API configured to communicate with the device shadowing service 214, devices 238, and applications and services 226 using a Hypertext Transfer Protocol (HTTP). Combinations of named logical channels and RESTful APIs may be used in some examples.

The various processes and/or other functionality contained within the system environment 200 may be executed on one or more processors that are in communication with one or more memory modules. The system environment 200 may include a number of computing devices that are arranged, for example, in one or more server banks or computer banks or other arrangements. The computing devices may support a computing environment using hypervisors, virtual machine monitors (VMMs) and other virtualization software.

Various data store services may be used in implementing the technology. For example, an object data store service or a NoSQL data store service may be used. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the computing service environment 402 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 236 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
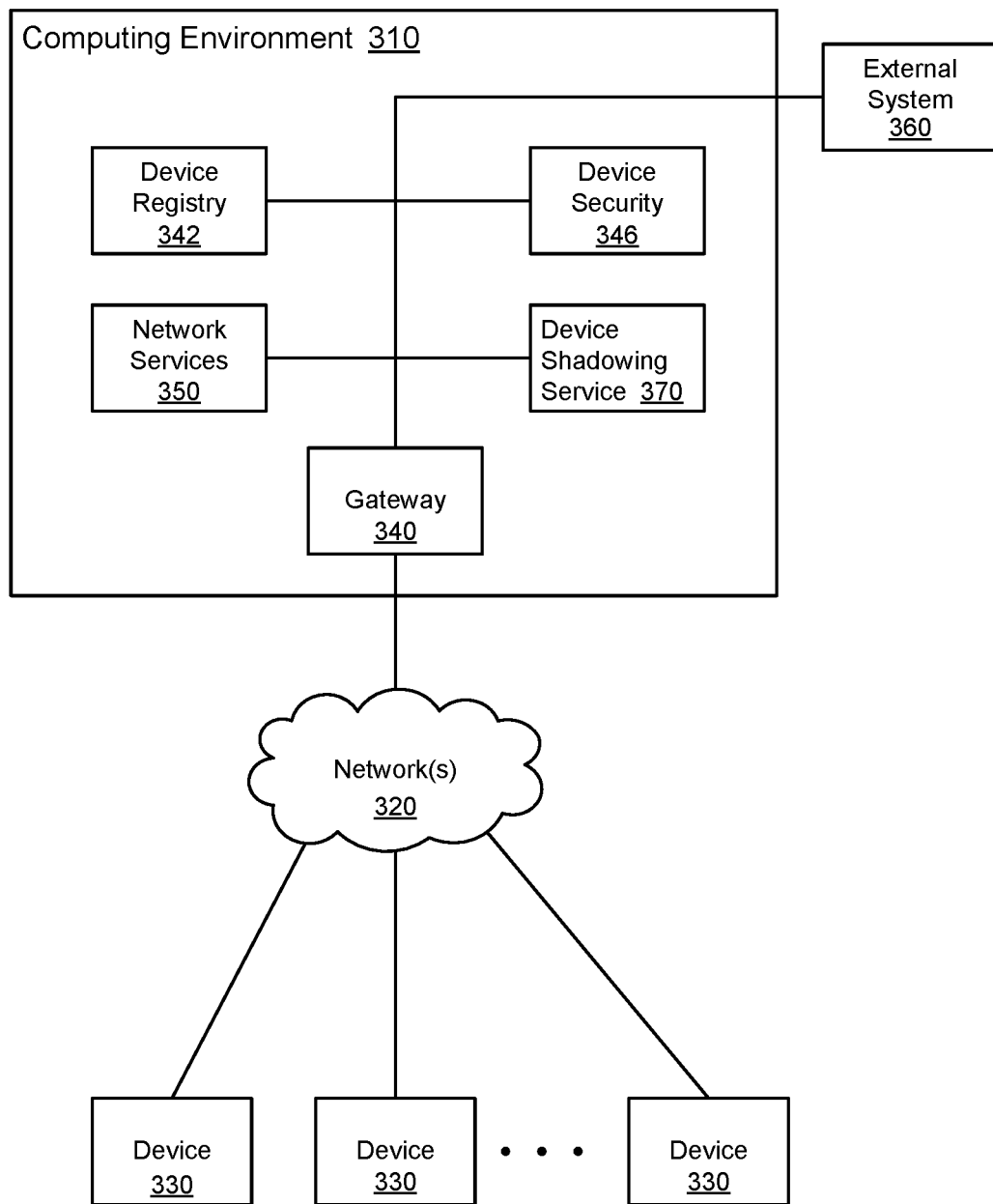
FIG. 3 is a block diagram illustrating an example computer networking architecture for providing devices access to network services.

FIG. 3 is a diagram illustrating an example computing environment 310 with which devices 330 may communicate. The computing environment 310, which may be referred to as a device communication environment or system, comprises various resources that are made accessible via a gateway server 340 to the devices 330 that access the gateway server 340 via a network 320. The devices 330 may access the computing environment 310 in order to access services such as a device shadowing service server 370, data storage, and computing processing features. Services operating in the computing environment 310 may communicate data and messages to the devices 330 in response to requests from the devices 330 and/or in response to computing operations within the services.

The computing environment 310 comprises communicatively coupled component systems 340, 342, 346, 350 and 370 that operate to provide services to the devices 330. The gateway server 340 may be programmed to provide an interface between the devices 330 and the computing environment 310. The gateway server 340 receives requests from the devices 330 and forwards corresponding data and messages to the appropriate systems within the computing environment 310. Likewise, when systems within the computing environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 340 may be programmed to convert the data and instructions or messages received from the devices 330 into a format that may be used by other of the server systems comprised in the computing environment 310. In one example, the gateway server 340 may be adapted to convert a message received using the HTTPS protocol into a JSON (JavaScript Object Notation) formatted message that is suitable for communication to other servers within the computing environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the computing environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise an actual state and a desired state. The actual state represents the existing state of the particular device 330 as presently known to the server 370. In an example scenario, for example, the device shadowing service server 370 may identify that the actual state of a light switch device is "on." The desired state represents a state to which it is desired to change the status. In an example scenario, the device shadowing service server 370 may identify the desired state of a light switch device is "off." The network services server 350 may communicate with the device shadowing service server 370 in order to change the desired state information. The device shadowing service server 370 communicates with device gateway 340 in order to communicate requests to update a status to a particular device 330. For example, the device shadowing sever 370 may communicate to device gateway 340 that a particular switch device should have its state changed to "off." The device gateway 340 may, in response, communicate the appropriate command formatted for the particular device 330.

The device security server 346 maintains security-related information for the devices 330 that connect to the computing environment 310. In one example, the device security server 346 may be programmed to process requests to register devices with the computing environment 310. For example, entities such as device manufacturers, may forward requests to register devices 330 with the computing environment 310. The device security server 346 receives registration requests and assigns unique device identifiers to devices 330 which use the device identifiers on subsequent requests to access the computing environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the computing environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in computing environment 310 or which communicates the request to the computing environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access computing environment 310 for any number of purposes. In one example, an external system 360 may be a system adapted to forward requests to register devices 330 with the computing environment 310. For example, an external system 360 may include a server operated by or for a device manufacturer that sends requests to computing environment 310, and device security server 346 in particular, to register devices 330 for operation with computing environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the computing environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the computing environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within computing environment 310. The gateway server 340 may be programmed to receive and, if needed, attend to converting such requests for processing with the computing environment 310.

Figure 4:
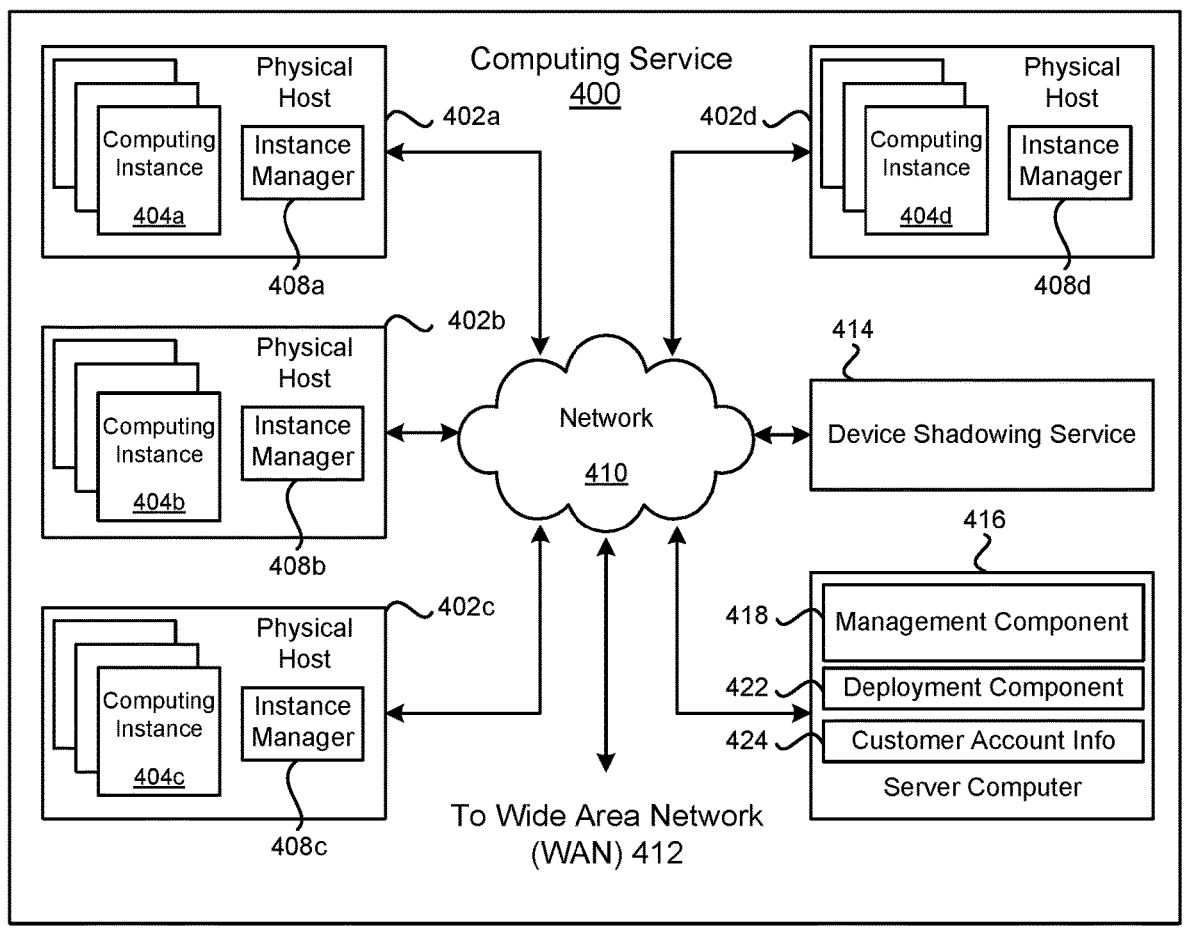
FIG. 4 is a block diagram that illustrates an example computing service environment that includes a device shadowing service.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d that provide network services to devices.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute one or more computing instances that host a device shadowing service. The device shadowing service may be configured to manage device representations and associated states, commands, and events as described earlier.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
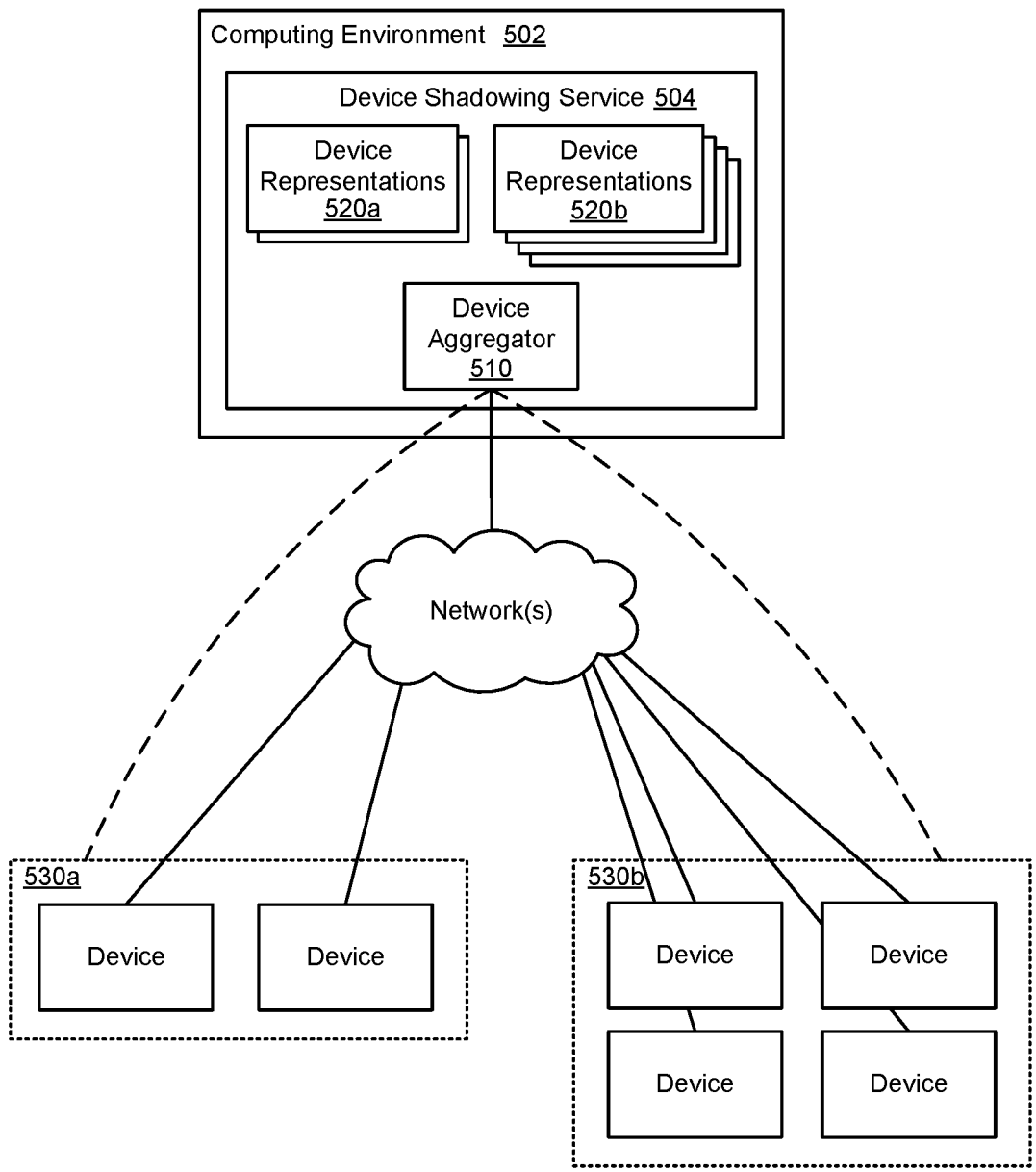
FIG. 5 a block diagram illustrating an example computing environment that includes a device shadowing service in network communication with groups of devices.

Moving now to FIG. 5, a block diagram illustrates an example computing environment 502 that includes a device shadowing service 504 that may be in network communication with groups of devices 530a or 530b. The device shadowing service 504 may manage device representations 520a-b for the groups of devices 530a-b, and the device shadowing service 504 may include a device aggregator 510 configured to perform aggregate operations, such as aggregate the states of the device representations 520a-b and execute commands and/or events related to a group of devices 530a-b.

In one example, the device aggregator 510 may be subscribed to a group channel or group topic to receive messages associated with devices included in a group of devices 530a-b, and the device aggregator 510 may aggregate the messages and update device representations 520a-b associated with the group of devices 530a-b. Devices included in a group of devices 530a-b may be associated with device representations 520a-b that have a type that defines states, commands, and/or events for the devices. As such, states, commands, and events associated with a group of devices 530a-b may be accessible through the device representations 520a-b and the device aggregator 510 may manage the group of devices 530a-b via the device representations 520a-b. For example, a combined state for a group of devices 530a-b may be obtained from the device aggregator 510, which may query multiple devices' device representation 520a-b for a state and aggregate the states into a combined state.

In one example, the device aggregator 510 may manage membership records that include identifiers for devices included in a group of devices 530a-b. The group membership records may be updated to reflect changes in membership of a group of devices 530a-b by adding or removing identifiers of devices 530a-b. The device aggregator 510 monitors messages received at the device shadowing service 504 for messages received from devices 530a-b having identifiers included in a group record.

In another example, the device aggregator 510 may be subscribed to a group topic (or group RESTful API) to which devices included in a group of device 530a-b publish messages. This allows the device aggregator 510 to subscribe to a group topic and monitor the group topic for updates received from devices that publish to the group topic. As devices are added and removed from a group of devices 530a-b, the devices publish to a group topic associated with the group of device 530a-b. As such, the device aggregator 510 does not keep track of membership of groups of devices 530a-b.

Group topics or group RESTful API's may allow for devices 530a-b to be to be added or removed from a group, or may allow for devices included in a group of devices 530a-b to be queried. For example, a group of devices 530a-b may be queried in order to identify, for example, devices included in the group that have a certain state or attribute. In one example, groups of devices 530a-b may be defined by identifying devices that have a particular state or attribute and including the devices in a group of devices 530a-b. Devices may be added and removed from the group of devices 530a-b dynamically according to a state or attribute used to define the group of devices 530a-b. As an illustration, network addressable lights having the state "LightOn" may be added to a group and may be removed from the group when the state changes to "LightOff".

As indicated above, the device representations 520a-b may be assigned a type that defines states, commands, and/or events associated with a group of devices 530a-b. Accordingly, an aggregated state for the group of devices 530a-b may be obtained by the device aggregator 510 from the device representations 520a-b. As an illustration, a farm may use network addressable moisture sensors to monitor the water moisture of individual plants in plots of different types of plants (e.g., lettuce, carrots, tomatoes, potatoes, etc.). Plants of different types may need different moisture levels. Rather than reacting to a moisture level for an individual plant, moisture sensors may be grouped according to plant type and the plants included in the group may be watered according to an aggregated state representing a group moisture level reading obtained using the device aggregator 510.

Commands and events associated with the group of devices 530a-b may be invoked through the device aggregator 510 that propagates a command or event to the device representations 520a-b. As an illustration, a group of network addressable lights on a floor of a building may be powered on or off using a command invoked through the device aggregator 510. Invoking the command may cause the device aggregator 510 to iterate the command on each device representation 520a-b associated with a network addressable light included in the group. In one example, only devices having a type that supports a particular command may be added to a group of devices 530a-b. Therefore, an attempt to add a device to a group of devices 530a-b that does not support the group's commands may be rejected.

Figure 6:
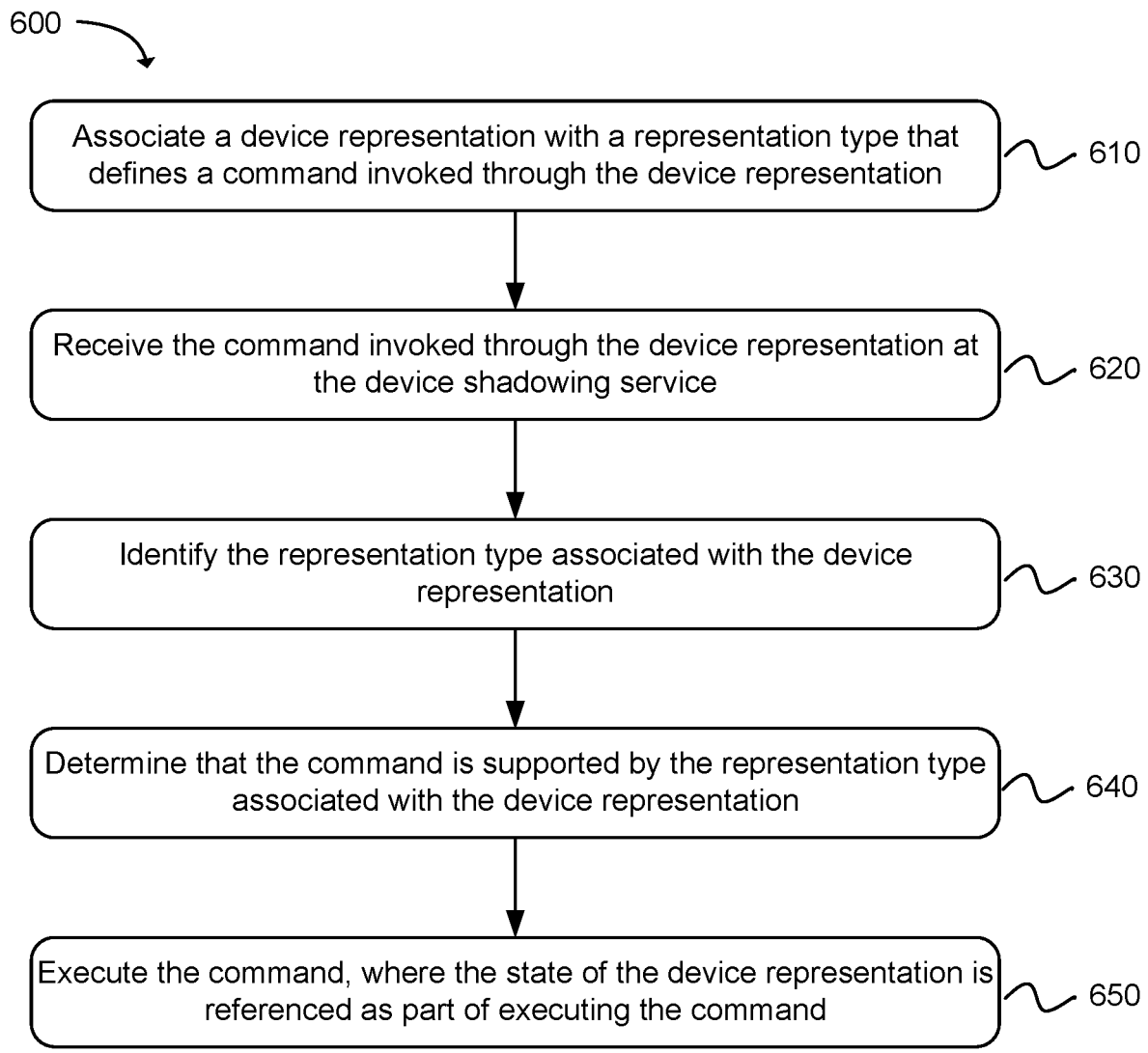
FIG. 6 is a flow diagram illustrating an example method for operating a device shadowing service configured to manage device representations for physical devices that are network addressable.

FIG. 6 is a flow diagram that illustrates an example method 600 for operating a device shadowing service configured to manage device representations for physical devices that are network addressable. A device representation may be a data representation (e.g., a data record) of a state of a physical device. Illustratively, a device may be configured to connect (e.g., intermittently) to the device shadowing service over one or more networks and either update the state of a device representation associated with the device with the device's current state, or assume the state of the device representation representing the desired state of the device.

As in block 610, a device representation may be associated with a representation type that defines a command that may be invoked through the device representation. The device representation may be a representation of a copy of a state of the device. As a simplistic example, a device representation may represent an "on" state or an "off" state of a device. A representation type may be associated with a schema that describes the structure of the device representation and the representation type may define commands (inputs) and events (outputs) that may be invoked through the device representation. A command defined by a representation type may be associated with command schema that describes a structure of the command (e.g., command syntax), and an event defined by a representation type may be associated with an event schema that describes a structure of the event (e.g., event syntax). A command may be an instruction to change the state of a device representation (e.g., an instruction to change the state to "on" or "off"), or a command may be an instruction to invoke a function that expands the functionality of a device representation beyond a physical configuration of an associated device (e.g., a function that calculates average temperature).

After associating a device representation with a representation type, commands defined by the representation type may be invoked through the device representation. As in block 620, a command invoked through the device representation may be received at the device shadowing service. The command may be received at the device shadowing service using a publication/subscription channel or topics, where a message is published to a topic and the message published to the topic is received by subscribers to the topic. Illustratively, applications, services, and/or devices may publish messages to a topic and a device shadowing service may subscribe to the topic in order to receive the messages published by the applications, services, and/or devices. Alternatively, or in addition to the topics, the command may be received at the device shadowing service using a RESTful API configured to communicate with the device shadowing service, devices, applications, and/or services using HTTP.

After receiving the command and validating the identity of the command propagator, as in block 630, the representation type associated with the device representation may be identified (e.g., by referencing a device representation record, such as a JSON record), and as in block 640, a determination whether the command is supported by the representation type may be made. In the case that the representation type does not support the command, an error may be generated. For example, an error message may be generated and the error message may be published to a topic, thereby informing an application, service, or other device subscribed to the topic that the command failed to execute due to not being supported by the device representation.

In the case that the representation type supports the command, as in block 650, the command may be executed and the state of the device representation may be referenced as part of executing the command. For instance, the state may be retrieved (e.g., retrieve temperature) as part of executing the command, or the state may be referenced as part of executing the command (e.g., if temperature is >71°, activate cooling, if temperature is <67°, activate heating). In one example, executing a command may include calling a function configured to execute the command. For example, the command "AveragePowerConsumption" may invoke a function that averages power used by a device over a time period. Executing events may be similar to executing commands. Namely, an event may be validated against a representation type to determine whether the representation type supports the event, whereupon the event may be executed if the event is supported by the representation type.

In some examples, prior to executing a command or event, a determination whether the command or event is public or private may be made. Public commands and events may be accessible to any application, service, and/or device having the capability to communicate with the device shadowing service, whereas private commands and events may be accessible to only authorized applications, services, and/or devices. For example, security policies may allow customers to control who has access to commands and events that the customer defines. Thus, in determining that a command or event is private, a command propagator (e.g., application, service, or device) may be identified as being either authorized or unauthorized to invoke the command or event.

In executing a command, the state of a device representation may be updated and a device may be instructed to assume the state of the device representation. As an example, updating a state of a device representation for a network addressable light to "on" may result in instructing the network addressable light to assume the state of "on". After a command has been executed, a message may be sent to a command propagator (e.g., application, service, or device) indicating that the command was executed and indicating an outcome of executing the command. For example, a device representation or a device may emit an event that indicates whether a command was successfully executed and the event may be published to a topic subscribed to by the command propagator.

Figure 7:
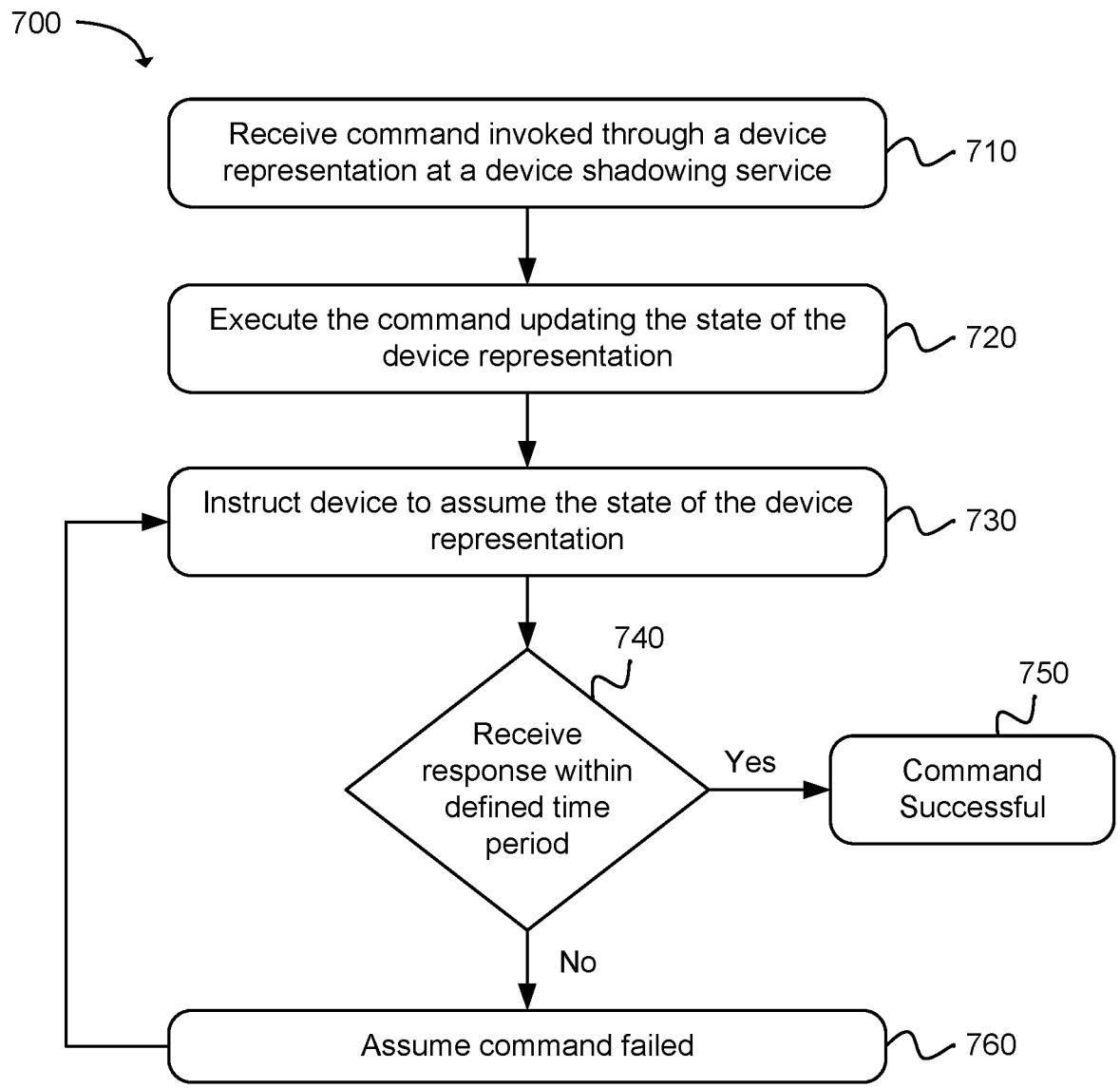
FIG. 7 is a flow diagram that illustrates an example method for determining whether a device has assumed a state of a device representation associated with the device.

FIG. 7 is a flow diagram illustrating an example method 700 for determining whether a device has assumed a state of a device representation associated with the device. As in block 710, a command invoked through a device representation may be received at a device shadowing service as described earlier. In response, as in block 720, the command may be executed, resulting in updating the state of the device representation. As an example, a temperature state of a device representation for a network addressable thermostat may be set to a specified temperature (e.g., changed from 75° F. to 68° F.).

After executing the command, the device may be instructed to assume the state of the device representation, as in block 730. As an example, a network addressable thermostat may be instructed, via a message published to a topic subscribed to by the thermostat, to set the thermostat's temperature to the temperature state of an associated device representation.

The device shadowing service may be configured to monitor a topic to determine whether a response is received within a defined time period indicating that the device has assumed the state of the device representation, as in block 740. The defined time period may be any length and may be based on a frequency of a device connecting to a network (e.g., every 20 seconds, 1 minute, 1 hour, etc.). As an example, in receiving an instruction to assume the state of a device representation, a network addressable thermostat may assume the state (i.e., set the temperature state of the thermostat to the state of the device representation) and publish a message to a topic informing a device shadowing service that the thermostat has assumed the state. If the message is received at the device shadowing service within the defined time period, then as in block 750, execution of the command may be considered successful. As an example, if a message is received from a network addressable thermostat within 30 seconds, an assumption may be made that the command was successful. In one example, a message may be sent to the propagator of the command (e.g., an application, service, or device) indicating that the command was successful.

In the case that a response is not received within the defined time period, then as in block 760, an assumption may be made that the device did not assume the state of the device representation based in part on a failure to receive a confirmation from the device within the defined time period, resulting in the failure of the command. In one example, the device may again be instructed to assume the state of the device representation and the device shadowing service may wait the defined time period for a message indicating that the device has assumed the state. In another example, an error handler may be defined that manages a number of attempts to instruct a device to assume a state of a device representation and sends a message to a command propagator indicating that the command failed, thereby allowing the command propagator may decide whether to invoke the command again.

Figure 8:
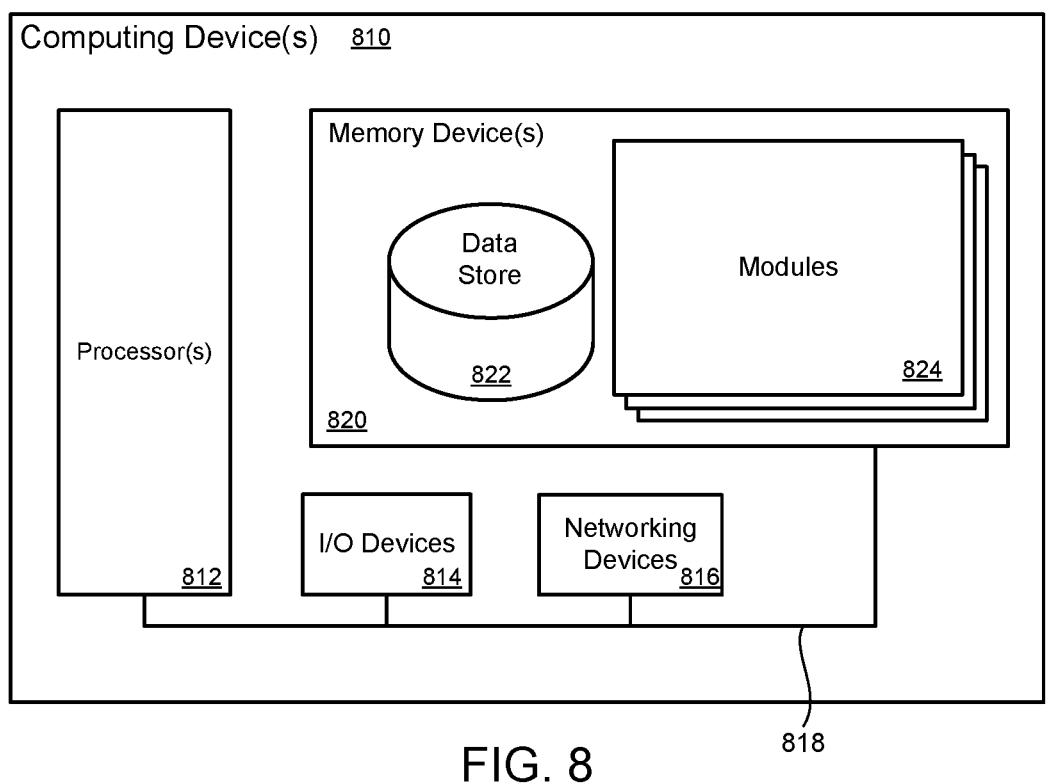
FIG. 8 is block diagram illustrating an example of a computing device that may be used to execute a method for operating a device shadowing service.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device 820 may contain a validation module, execution module, security module, type module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that, when executed by the at least one processor, cause the system to:
   receive a message publishing a command associated with a device which connects to a device shadowing service hosted in a computing service environment, wherein the device shadowing service maintains a device representation that represents a state of the device;
   validate the command against a representation type associated with the device representation, wherein the representation type defines commands that are supported by the device representation;
   execute the command associated with the device; and
   publish an event message instructing the device to assume the state of the device representation.

2. The system in claim 1, wherein the state of the device representation is referenced as part of executing the command and the state of the device representation is updated as part of executing the command.

3. The system in claim 1, wherein at least one command defined by the representation type expands functionality of the device representation for the device beyond a physical capability of the device.

4. The system in claim 1, wherein event messages are published to a publication/subscription channel, which is a named logical channel, and messages published to the publication/subscription channel are received by subscribing devices and services.

5. The system in claim 1, wherein the memory device further includes instructions that, when executed by the at least one processor, cause the system to publish an event message to a publication/subscription channel indicating that the command has been executed.

6. The system in claim 1, wherein the message publishing the command is published by an application configured to interact with the device.

7. A computer implemented method, comprising:
   receiving a message that publishes a command associated with a device which connects through a network to a device shadowing service hosted in a computing service environment, wherein the device shadowing service maintains a device representation that represents a state of the device;
   validating the command against a representation type associated with the device representation, wherein the representation type defines commands that are supported by the device representation;
   executing the command, wherein the state of the device representation is referenced as part of executing the command and the state of the device representation is updated as part of executing the command;
   publishing an event message to a publication/subscription channel instructing the device to assume the state of the device representation; and
   publishing a confirmation message indicating that the command has been executed.

8. The method in claim 7, further comprising assigning the representation type to the device representation to define the commands supported by the device representation.

9. The method in claim 7, wherein the representation type is associated with a schema that defines a structure of the device representation.

10. The method in claim 7, further comprising:
    receiving a request for the representation type; and
    providing the representation type to allow interaction with the device representation using the commands defined by the representation type.

11. The method in claim 7, wherein the command defined by the representation type has a command type that is associated with a command schema that defines a structure of the command.

12. The method in claim 11, wherein validating the command against the representation type further comprises determining that the command complies with the command schema.

13. The method in claim 7, wherein the representation type further defines events that are supported by the device representation.

14. The method in claim 13, wherein an event defined by the representation type has an event type that is associated with an event schema that describes a structure of the event.

15. The method in claim 13, further comprising validating the event message that instructs the device to assume the state of the device representation against the event type.

16. A non-transitory machine readable storage medium having instructions embodied thereon, the instructions when executed by one or more processors:
    receive a message publishing a command associated with a device that connects through a network to a device shadowing service hosted in a computing service environment, wherein the device shadowing service maintains a device representation that represents a state of the device;
    identify a representation type associated with the device representation, wherein the representation type defines commands that are supported by the device representation;
    determine that the command is supported by the representation type;
    execute the command, wherein the state of the device representation is updated as part of executing the command; and
    publish an event message to a publication/subscription channel instructing the device to assume the state of the device representation.

17. A non-transitory machine readable storage medium as in claim 16, further comprising instructions, that when executed by the one or more processors:
    determine that the representation type is private, wherein the commands defined by the representation type are private commands accessible to authorized entities; and
    determine that an entity that published the message is authorized to invoke the command.

18. A non-transitory machine readable storage medium as in claim 16, wherein the message publishing the command is published to a named publication/subscription channel, and the device shadowing service is subscribed to the named publication/subscription channel to enable the device shadowing service to receive the message.

19. A non-transitory machine readable storage medium as in claim 16, further comprising instructions, that when executed by the one or more processors, receive a message published by the device to a named publication/subscription channel indicating that the device assumed the state of the device representation.

20. A non-transitory machine readable storage medium as in claim 16, further comprising instructions, that when executed by the one or more processors, publish a confirmation message to a named publication/subscription channel to indicate to subscribers that the device has assumed the state of the device representation.

\* \* \* \* \*